Sept. 2, 1941.    C. R. CASLAKE    2,254,564
WHEEL TRUCK
Filed March 17, 1939
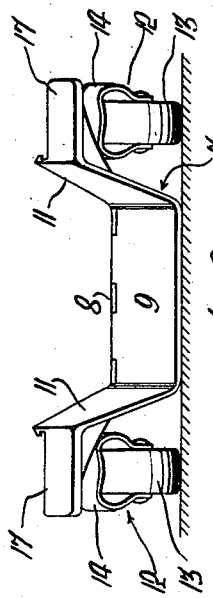
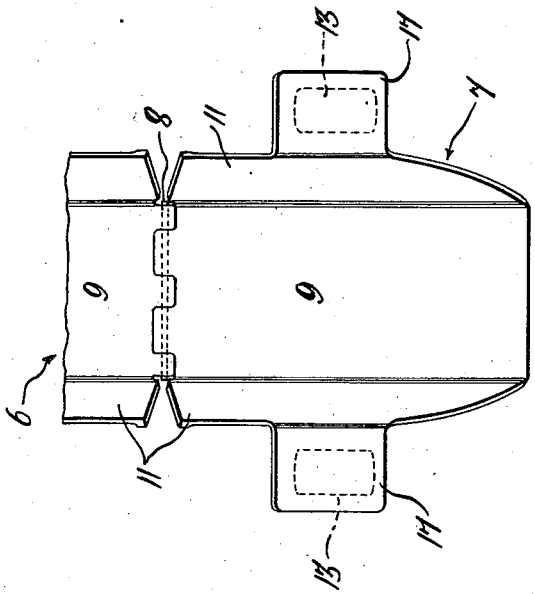
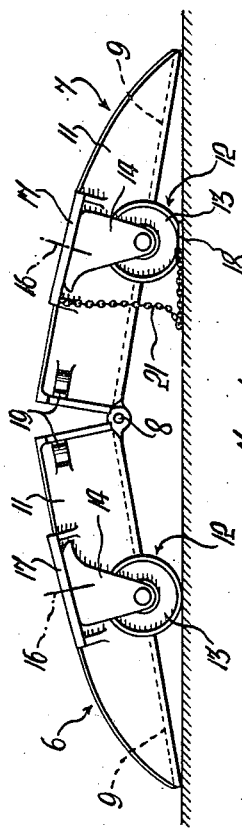
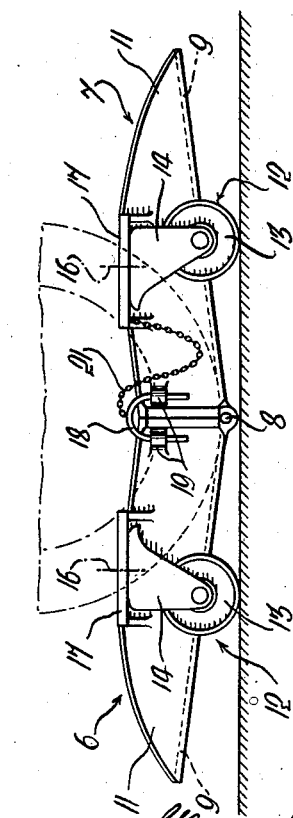
Inventor
C. R. Caslake
By: Glascock Downing & Seebold
Attys.

Patented Sept. 2, 1941

2,254,564

UNITED STATES PATENT OFFICE 2,254,564

WHEEL TRUCK

Charles Robert Caslake, Tooronga, Melbourne, Victoria, Australia

Application March 17, 1939, Serial No. 262,556
In Australia March 31, 1938

3 Claims. (Cl. 280—61)

The primary object of this invention is to provide simple and effective means whereby grounded aeroplanes and other mobile machines may be readily manoeuvred within, and into and out of, hangars or other relatively confined spaces or enclosures.

The invention contemplates the use of trolley devices, of a character that will be described hereinafter, one of which devices is utilized for each ground wheel of an aeroplane, for example, whereby it can be readily moved over the ground in any direction, i. e., by universal movement, thus rendering it a comparatively simple matter to move the aeroplane into and out of a hangar and to manoeuvre it as may be desired within the hangar with safety notwithstanding that there may be little space for free movement.

With the invention it becomes possible to readily pack or park aeroplanes in any desired position in a hangar or other such enclosure and to remove any particular aeroplane with a minimum of disturbance to other aeroplanes. Similar remarks apply to the manoeuvring and parking of automobile vehicles in garages, parking stations and other such places.

Referring to the drawing which forms part of this specification:

Figure 1 is a side elevation of a trolley device according to one practical embodiment of the invention, and shown in a stationary or receiving position.

Figure 2 is an end view of the trolley device.

Figure 3 is a fragmentary plan view.

Figure 4 is a side elevation of the trolley in a travelling position.

Each trolley device comprises two platform or ramp sections 6, 7 which are hingeably or similarly connected as at 8 about an axis extending transversely at the inner or meeting ends of the two sections. Each section comprises a ramp 9, preferably having walls or cheeks 11 upstanding from its two side edges. The respective side walls 11 of the sections are in longitudinal alignment with each other and are preferably inclined outwardly and upwardly as indicated in the drawing.

Each section is provided with two castors 12, or the equivalents, which are appropriately mounted at opposite sides of the respective sections and intermediate the outer end of the ramp 9 and the hinge 8 of the two sections. Each castor device comprises a ground engaging roller 13 journalled in a yoke or bracket 14 capable of swivelling in a horizontal plane about a pivot pin or the like (the axis of which is indicated at 16) that may be retained to a flange or web 17 outstanding from the respective side wall 11. It will be evident that the castors enable the trolley to be moved over the ground in any direction.

The hinge 8 enables the trolley sections to assume two positions, namely, a first or receiving position (Figures 1, 2 and 3) in which the ramps 9 slope downwardly from their hinged ends to their outer ends which latter would in such case be at ground level or approximately ground level, while the hinged meeting ends will be in a relatively elevated position. In the other or travelling position (Figure 4), the hinged ends are depressed while the outer ends of the ramps are elevated so that the ramps slope downwards from their outer ends towards their hinged meeting ends. The change from the first or receiving position to the second or travelling position is effected automatically by the action of the ground wheel of an aeorplane or vehicle riding up one of the ramps.

Thus, by way of example, a grounded aeroplane that is to be placed within a hanger may be taxied to a convenient position where two of the trolleys are waiting in their receiving positions (Figure 1). The aeroplane is then pushed so that its two front ground wheels ride up the respective ramps 9 of the two trolleys. As the wheels move past the adjacent castor devices, the hinged meeting ends of the ramps 9 are, due to weight of the aeroplane, automatically depressed and the outer ends of the ramps are raised; the castors acting in effect as the fulcra for the swinging movement of the ramps 9, about their hinge connection. Such swinging movement of the ramps is limited by the engagement of the inner end edges of the respective side walls 11 with each other. The ground wheels of the aeroplane come to rest in approximate vertical alignment with the hinged connections of the trolley sections as in Figure 4 so that the weight of the aeroplane tends to maintain the trolley sections rigid in their travelling positions.

It is to be particularly noted in connection with Fig. 4 that the adjacent inner edges of the side walls 11 of each of the sections of the trolley are slightly inclined upwardly and outwardly from the hinge connection so that when a ground wheel of an aeroplane is in position in the inner parts of the ramps the inclined side walls abut each other, while the inner parts of the ramp are maintained in downwardly inclined relation toward each other to prevent accidental displacement of the wheel.

It will be evident that with the ramps now inclined upwardly towards their outer ends there is little possibility of the ground wheels of the aeroplane inadvertently riding off the trolleys. However, as a precautionary measure, the two sections of each trolley may be positively locked together as by means of a U shaped keeper 18, the legs of which are inserted into apertured lugs 19 outstanding from the trolley sections. This keeper may be carried at one end of a chain 21 that is attached at its other end to one of the trolley sections.

The aeroplane, supported by the trolleys, as aforesaid, may be pushed in any desired direction as the castors will automatically adjust themselves to enable the trolleys to move and convey the aeroplane according to the direction in which it is pushed. Thus the aeroplane may be readily moved straight ahead, or in reverse, or with a lateral or traversing movement or in any oblique direction.

It is, therefore, readily possible to manoeuvre the aeroplane into any desired position within a hangar or other enclosure. The trolleys may be left in position if so desired ready to adjust the position of the aeroplane or to facilitate its removal from the hangar as occasion may require.

Alternatively, the trolleys may be freed from the aeroplane as, for instance, by placing the keeper 18 upon the ground so that its legs extend around one of the castors of each trolley and by pushing the aeroplane so that the ground wheels thereof ride along the trolley ramps which are thereby automatically moved into the first-mentioned position (Figure 1) to enable the ground wheels to roll into contact with the ground whereupon the trolleys may be moved away for further duty.

The aforesaid keeper device 18 may also be brought into use when an aeroplane is being moved onto the trolleys. In that event, the keeper may be placed upon the ground with its legs extending around one of the castors of each trolley, as in Figure 1, in order to prevent inadvertent movement of the trolley while the aeroplane wheels are riding up the ramps.

If found necessary or advisable, springs or other means (not shown) may be provided to cushion the tilting movements of the trolley sections about their hinged connection from their first position into their travelling position and vice-versa.

The operation of the trolley devices when used in connection with motor vehicles or other mobile machines is substantially similar to that previously described with reference to aeroplanes, a trolley device being utilized for each ground wheel of the vehicle or the like.

Although each trolley device has been described and illustrated as having four castors, such a number is not essential in all cases. For example, one of the trolley sections may have two castors, while the other section may be fitted with a single castor preferably located centrally of the width and of the length of that section.

Having now described my invention, what I claim as new and desire to secure by Letters Patent is:

1. A trolley for the purposes indicated, comprising two sections having ramps that are pivotally interconnected about an axis extending transversely at their inner or meeting ends, caster devices associated with said ramps intermediate their pivotal connection and their outer ends, whereby the trolley may assume two positions, namely, a first or receiving position in which the ramps are inclined downwardly from their pivoted meeting ends to their outer ends for enabling a ground wheel of a relatively heavy mobile machine to ride up one of the ramps, and a second or travelling position in which the pivoted meeting ends of the ramp are depressed and the outer ends of the ramps are raised for enabling the trolley and the heavy mobile machine supported thereby to be moved over the ground in any desired direction, and means for positively locking said two sections in their second position comprising a pair of apertured lugs on the respective sections and a substantially U-shaped locking member having legs adapted to be inserted into said apertured lugs, said locking member being capable of cooperation with a wheel of one of said caster devices in order to prevent inadvertent movement of the trolley whether the latter is in its first or its second position.

2. A trolley for the purposes indicated, comprising in combination two sections in the form of ramps pivotally interconnected about an axis extending transversely at their inner meeting ends and having side walls, caster devices swivelled to said ramps intermediate their pivotal connection and their outer ends, whereby the trolley may assume two positions, namely, a first or receiving position in which the ramps are inclined downwardly from their pivoted meeting ends to their outer ends for enabling a ground wheel of a relatively heavy mobile machine to freely ride directly up one of the ramps, and a second or travelling position in which the pivoted meeting ends of the ramps are depressed into abutting engagement with each other and the outer end of the ramps are raised for enabling the trolley and the heavy mobile machine supported thereby to be moved over the ground in any desired direction and means for positively locking said two sections in their second or traveling positions comprising a pair of apertured lugs on the side walls of the respective sections, and a locking member having legs adapted to be inserted into said apertured lugs.

3. A trolley for the purposes indicated comprising two substantially identical members of approximate channel shape in cross section, each member including a ramp, side walls upstanding from opposite side edges of said ramps, means pivotally connecting said members together about a transverse axis at the meeting ends of said ramps, castor devices associated with said ramps substantially midway between their ends, said castor devices constituting fulcra about which said ramps are caused to swing automatically by the tracking of a ground wheel of a mobile machine up or down one of the ramps, such swinging movement of the ramps to a wheel carrying position being limited by the engagement of the inner edges of said side walls with each other and swinging to an unloading position being limited by the engagement of the outer edges of the members with a supporting surface, the adjacent inner edges of the side walls of each of the members being slightly inclined upwardly and outwardly from the pivotal connection so that when a wheel is in position on the inner parts of the ramps the inclined side edges abut each other while the inner parts of the ramp are maintained in downwardly inclined relation toward each other to prevent accidental displacement of the wheel.

CHARLES ROBERT CASLAKE.